(12) United States Patent
Wu (10) Patent No.: US 9,383,728 B2
(45) Date of Patent: Jul. 5, 2016

(54) METHOD, DEVICE, SERVER, AND SYSTEM FOR CONFIGURING DAYLIGHT SAVING TIME

(71) Applicant: Huawei Device Co., Ltd., Shenzhen (CN)

(72) Inventor: Tiejun Wu, Wuhan (CN)

(73) Assignee: Huawei Device Co., Ltd., Shenzhen (CN)

(*) Notice: Subject to any disclaimer, the term of this patent is extended or adjusted under 35 U.S.C. 154(b) by 407 days.

(21) Appl. No.: 13/800,552

(22) Filed: Mar. 13, 2013

(65) Prior Publication Data

US 2014/0092713 A1      Apr. 3, 2014

(30) Foreign Application Priority Data

Mar. 22, 2012   (CN) .......................... 2012 1 0079376

(51) Int. Cl.
*G04G 5/00*      (2013.01)
*G06Q 10/06*     (2012.01)

(52) U.S. Cl.
CPC . *G04G 5/00* (2013.01); *G06Q 10/06* (2013.01)

(58) Field of Classification Search
CPC ........ G04R 20/02; G04R 20/14; G04R 20/18; G04G 5/002; G04G 5/04; G04G 5/00; G04C 9/02
See application file for complete search history.

(56) References Cited

U.S. PATENT DOCUMENTS

| 6,982,950 | B1 | 1/2006 | Gardner |
| 7,916,580 | B2 * | 3/2011 | Nalla ................. G06Q 10/1091 368/21 |
| 7,948,832 | B1 * | 5/2011 | Luo et al. ........................ 368/21 |
| 2002/0181333 | A1 | 12/2002 | Ito et al. |
| 2006/0002236 | A1 | 1/2006 | Punkka |

(Continued)

FOREIGN PATENT DOCUMENTS

| CN | 1304103 A | 7/2001 |
| CN | 1331899 A | 1/2002 |

(Continued)

OTHER PUBLICATIONS

Extended European Search Report issued in corresponding European Patent Application No. 13159979.7, mailed Jun. 20, 2013, 9 pages.

(Continued)

*Primary Examiner* — Amy Cohen Johnson
*Assistant Examiner* — Matthew Powell
(74) *Attorney, Agent, or Firm* — Brinks Gilson & Lione (57) ABSTRACT

The present invention discloses a method, a device, a server, and a system for configuring daylight saving time, belonging to the field of communications. The method includes: receiving, by a CPE, a message carrying a daylight saving time rule parameter; if a daylight saving time enable flag displays that daylight saving time is enabled, extracting, by the CPE, the daylight saving time rule parameter from the message; obtaining the current year of the CPE; and obtaining start time or end time of daylight saving time according to the current year and the daylight saving time rule parameter. The system includes a CPE and a server. The CPE includes a receiving module, an extracting module, a first obtaining module, and a second obtaining module. The server includes a generating module and a sending module. Through the present invention, daylight saving time can be configured in a single attempt and used permanently.

19 Claims, 6 Drawing Sheets

(56) References Cited

U.S. PATENT DOCUMENTS

| | | | |
|---|---|---|---|
| 2006/0158963 A1* | 7/2006 | O'Neill et al. | 368/46 |
| 2007/0177463 A1 | 8/2007 | Kataoka | |
| 2007/0201311 A1* | 8/2007 | Olson | H04M 3/5175 368/29 |
| 2007/0206442 A1 | 9/2007 | Kim | |
| 2008/0056072 A1* | 3/2008 | Chen | G04C 3/14 368/46 |
| 2009/0290571 A1* | 11/2009 | Margolis | G04G 9/0076 370/350 |
| 2009/0296530 A1* | 12/2009 | Ozawa | G04G 5/002 368/47 |
| 2010/0017467 A1 | 1/2010 | Fujii | |
| 2010/0099406 A1* | 4/2010 | Anantharaman | H04W 8/183 455/434 |
| 2011/0130139 A1* | 6/2011 | Ali | H04W 4/02 455/435.1 |
| 2011/0163873 A1* | 7/2011 | McIntosh | 340/539.13 |
| 2011/0216628 A1* | 9/2011 | Nalla et al. | 368/21 |

FOREIGN PATENT DOCUMENTS

| | | |
|---|---|---|
| CN | 1430739 A | 7/2003 |
| CN | 1988481 A | 6/2007 |
| CN | 101026447 A | 8/2007 |
| CN | 101035331 A | 9/2007 |
| CN | 101043532 A | 9/2007 |
| CN | 101127982 A | 2/2008 |
| CN | 101600249 A | 12/2009 |
| CN | 101630426 A | 1/2010 |
| CN | 101662380 A | 3/2010 |
| CN | 101808280 A | 8/2010 |
| CN | 102075881 A | 5/2011 |
| CN | 102202386 A | 9/2011 |
| EP | 1833007 A2 | 9/2007 |
| EP | 2448342 A1 | 5/2012 |
| EP | 2515591 A1 | 10/2012 |
| WO | WO 2008/114239 A2 | 9/2008 |
| WO | WO 2010/109306 A1 | 9/2010 |

OTHER PUBLICATIONS

"Notice from the European Patent Office dated Oct. 1, 2007 concerning business methods" Official Journal EPO, Nov. 2007, pp. 592-593.
International Search Report issued in corresponding PCT Patent Application No. PCT/CN2013/070047, 15 pages.

* cited by examiner

METHOD, DEVICE, SERVER, AND SYSTEM FOR CONFIGURING DAYLIGHT SAVING TIME

CROSS-REFERENCE TO RELATED APPLICATION

This application claims priority to Chinese Patent Application No. 201210079376.7, filed on Mar. 22, 2012, which is hereby incorporated by reference in its entirety.

FIELD OF THE INVENTION

The present invention relates to the field of communications, and in particular, to a method, a device, a server, and a system for configuring daylight saving time.

BACKGROUND OF THE INVENTION

At present, the daylight saving time system is used in many places in the world. The daylight saving time system is a local time system artificially defined to save energy. In an implementation period of the daylight saving time system, all CPEs (Customer premise equipment, customer premises equipment) use unified time, where the time is referred to as daylight saving time.

Before the daylight saving time system is implemented every year, an administrator configures start time of the daylight saving time and end time of the daylight saving time in an ACS (Auto-Configuration Server, auto-configuration server). For example, the administrator may configure the start time of the daylight saving time to 2012-05-01 00:00:00 and the end time of the daylight saving time to 2012-10-01 23:59:59 in the ACS. Then the ACS broadcasts the start time of the daylight saving time and the end time of the daylight saving time to each CPE. After receiving the start time of the daylight saving time and the end time of the daylight saving time, the CPE starts using the daylight saving time at the start time of the daylight saving time, and stops using the daylight saving time at the end time of the daylight saving time. In this way, the CPE uses the daylight saving time in the implementation period of the daylight saving time system.

At present, before the daylight saving time system is implemented every year, the administrator needs to configure the start time of the daylight saving time and the end time of the daylight saving time in the ACS. There is a problem that the daylight saving time needs to be configured for multiple times.

SUMMARY OF THE INVENTION

The present invention provides a method and a device for configuring daylight saving time, which can solve the problem that the daylight saving time needs to be configured for multiple times. The technical solutions are as follows:

A system for configuring daylight saving time includes a server and a customer premises equipment CPE, where:

the server sends a message carrying a daylight saving time rule parameter, so that the CPE may obtain start time or end time of daylight saving time through the rule parameter; and the CPE receives and parses the message, so as to obtain the start time or end time of the daylight saving time.

A method for configuring daylight saving time includes:

receiving, by a customer premises equipment CPE, a message carrying a daylight saving time rule parameter;

if a daylight saving time enable flag displays that daylight saving time is enabled, extracting, by the CPE, the daylight saving time rule parameter from the message;

obtaining the current year of the CPE; and obtaining start time or end time of daylight saving time according to the current year and the daylight saving time rule parameter.

A method for configuring daylight saving time includes:

generating a message carrying a daylight saving time rule parameter, where the daylight saving time rule parameter includes: month m, week w, day d, hour H, minute M, and second S, or month m, date D, hour H, minute M, and second S; and sending, by a server, the message carrying the daylight saving time rule parameter to a customer premises equipment CPE, so that the CPE may obtain start time or end time of daylight saving time through the rule parameter.

A customer premises equipment CPE includes:

a receiving module, configured to receive a message carrying a daylight saving time rule parameter;

an extracting module, configured to: if a daylight saving time enable flag displays that daylight saving time is enabled, extract the daylight saving time rule parameter from the message;

a first obtaining module, configured to obtain the current year of the CPE; and a second obtaining module, configured to obtain start time or end time of daylight saving time according to the current year and the daylight saving time rule parameter.

A server includes:

a generating module, configured to generate a message carrying a daylight saving time rule parameter, where the daylight saving time rule parameter includes: month m, week w, day d, hour H, minute M, and second S, or month m, date D, hour H, minute M, and second S; and a sending module, configured to send the message carrying the daylight saving time rule parameter to a customer premises equipment CPE, so that the CPE may obtain start time or end time of daylight saving time through the rule parameter.

In the embodiments of the present invention, a CPE receives a message carrying a daylight saving time rule parameter; if a daylight saving time enable flag displays that daylight saving time is enabled, extracts the daylight saving time rule parameter from the message; obtains the current year; and obtains start time or end time of daylight saving time according to the obtained current year and the daylight saving time rule parameter. In this way, the daylight saving time rule parameter does not include the year, and an administrator needs to configure the daylight saving time rule parameter only once without configuring the start time of the daylight saving time and the end time of the daylight saving time before the daylight saving time system is implemented every year. Therefore, daylight saving time can be configured in a single attempt and used permanently.

DETAILED DESCRIPTION OF THE EMBODIMENTS

To make the objectives, technical solutions, and advantages of the present invention more comprehensible, the following further describes the embodiments of the present invention in detail with reference to the accompanying drawings.

Figure 1:
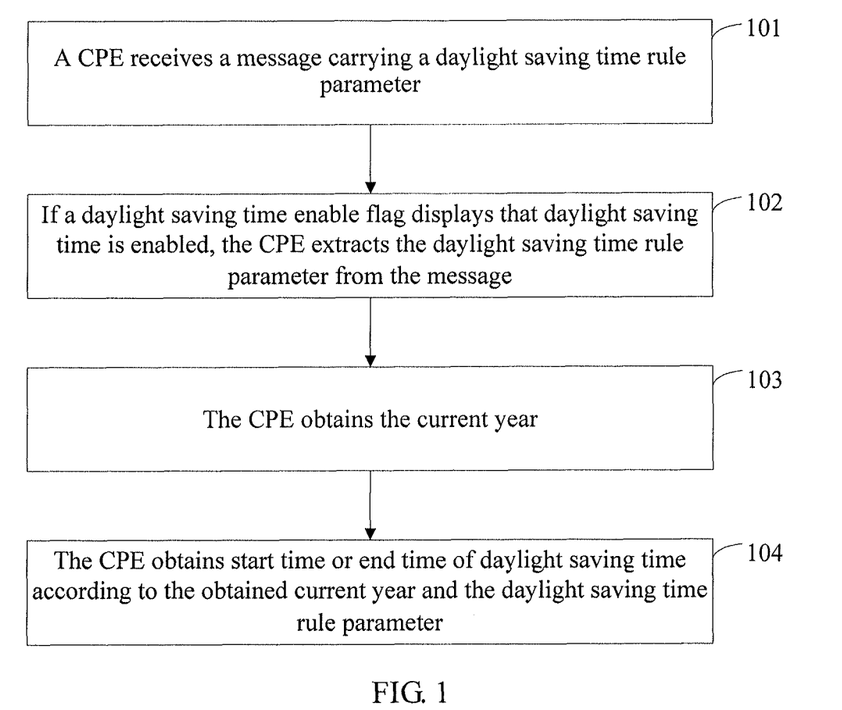
FIG. 1 is a flowchart of a method for configuring daylight saving time according to an embodiment of the present invention.

Referring to FIG. 1, an embodiment of the present invention provides a method for configuring daylight saving time, including:

Step 101: A CPE receives a message carrying a daylight saving time rule parameter.

Step 102: If a daylight saving time enable flag displays that daylight saving time is enabled, the CPE extracts the daylight saving time rule parameter from the message.

Step 103: The CPE obtains the current year.

Step 104: The CPE obtains start time or end time of daylight saving time according to the obtained current year and the daylight saving time rule parameter.

In the embodiment of the present invention, a CPE receives a message carrying a daylight saving time rule parameter; if a daylight saving time enable flag displays that daylight saving time is enabled, extracts the daylight saving time rule parameter from the message; obtains the current year; and obtains start time or end time of daylight saving time according to the obtained current year and the daylight saving time rule parameter. In this way, the daylight saving time rule parameter does not include the year, and an administrator needs to configure the daylight saving time rule parameter only once without configuring the start time of the daylight saving time and the end time of the daylight saving time before the daylight saving time system is implemented every year. Therefore, daylight saving time can be configured in a single attempt and used permanently.

Figure 2:
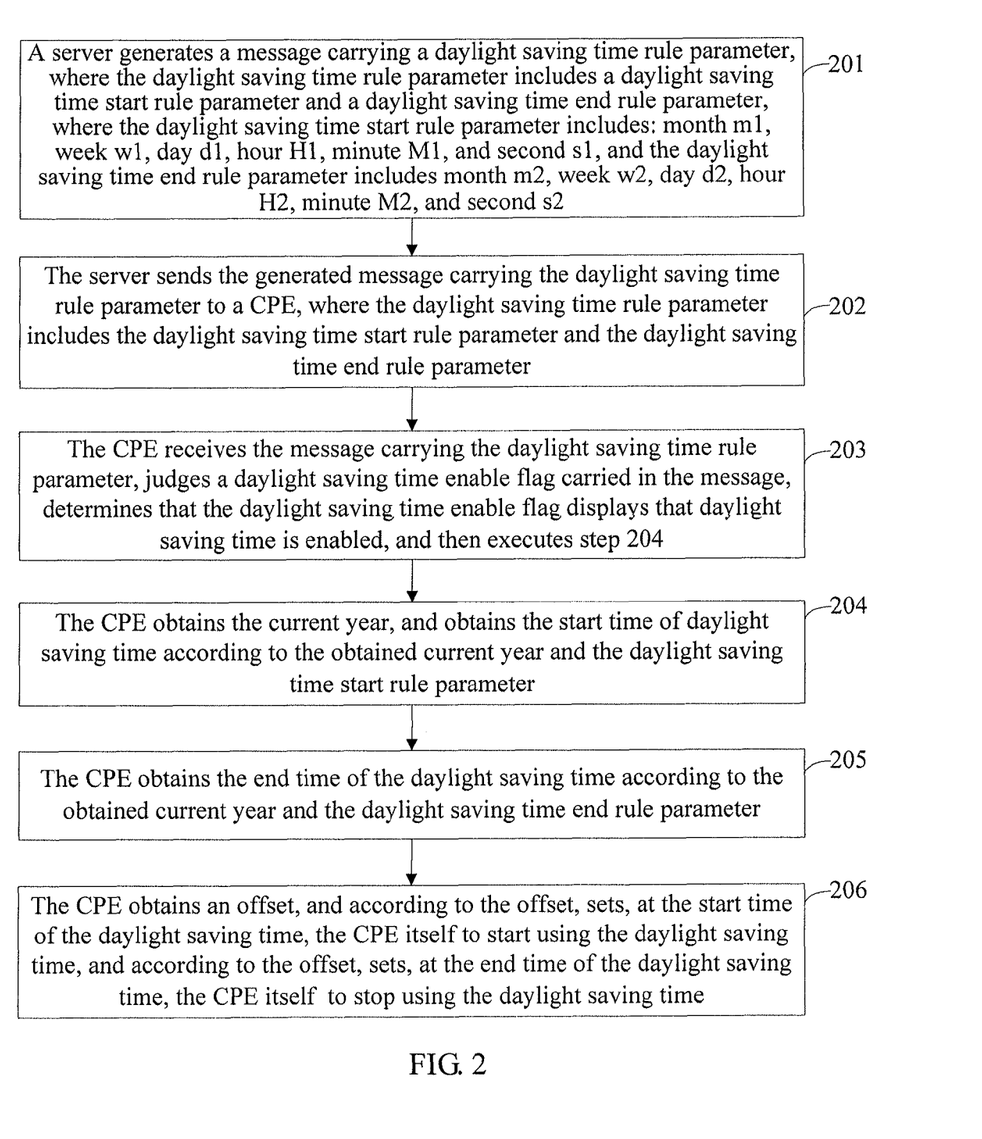
FIG. 2 is a flowchart of a method for configuring daylight saving time according to another embodiment of the present invention.

Referring to FIG. 2, an embodiment of the present invention provides a method for configuring daylight saving time, including:

Step 201: A server generates a message carrying a daylight saving time rule parameter, where the daylight saving time rule parameter includes a daylight saving time start rule parameter and a daylight saving time end rule parameter, where the daylight saving time start rule parameter includes: month m1, week w1, day d1, hour H1, minute M1, and second S1, and the daylight saving time end rule parameter includes month m2, week w2, day d2, hour H2, minute M2, and second S2.

Here, m1 and m2 are months, where the value of m1 is an integer in a range from 1 to 12, and the value of m2 is an integer in a range from m1 to 12; week w1 is week w1 in month m1, and week w2 is week w2 in month m2, where the value of w1 is an integer in a range from 1 to 5, and the value of w2 is an integer in a range from 1 to 5; day d1 is day d1 of week w1, and day d2 is day d2 of week w2, where the value of d1 is an integer in a range from 1 to 7, and the value of d2 is an integer in a range from 1 to 7; hour H1 is hour H1 of day d1, and hour H2 is hour H2 of day d2, where the value of H1 is an integer in a range from 0 to 23, and the value of H2 is an integer in a range from 0 to 23; minute M1 is minute M1 of hour H1, and minute M2 is minute M2 of hour H2, where the value of M1 is an integer in a range from 0 to 59, and the value of M2 is an integer in a range from 0 to 59; and second S1 is second S1 of minute M1, and second S2 is second S2 of minute M2, where the value of S1 is an integer in a range from 0 to 59, and the value of S2 is an integer in a range from 0 to 59.

For example, in this embodiment, the daylight saving time start rule parameter may include month 4, week 2, day 3, hour 12, minute 29, and second 15, and the daylight saving time end rule parameter may include month 10, week 3, day 5, hour 23, minute 5, and second 30, where the time represented by the daylight saving time start rule parameter is 12:29:15, Wednesday, in the second week of April, and the time represented by the daylight saving time end rule parameter is 23:05:30, Friday, in the third week of October.

In this embodiment, the message generated by the server may further carry an offset. In this way, the offset may be set according to requirements of the laws and regulations in the place where a CPE is located. The offset is the time difference between the daylight saving time and the normal time, the offset is greater than or equal to 0 minutes, and the offset is measured in minutes.

An administrator may input the daylight saving time start rule parameter, daylight saving time end rule parameter, and offset into the server beforehand, and then the server stores the daylight saving time start rule parameter, daylight saving time end rule parameter, and offset. Correspondingly, the server generates a message carrying the daylight saving time rule parameter before the daylight saving time system is implemented every year, where the message carries a daylight saving time enable flag, the daylight saving time start rule parameter, the daylight saving time end rule parameter, and the offset.

Figure 3:
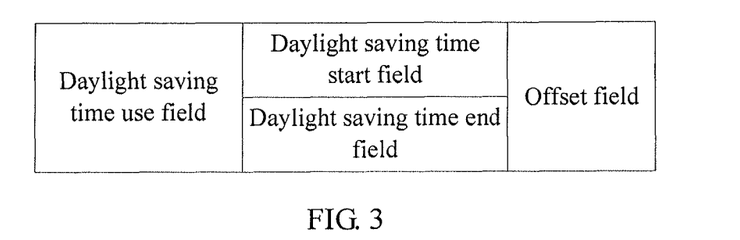
FIG. 3 is a schematic structural diagram of a first SOAP (Simple Object Access Protocol, Simple Object Access Protocol) message according to another embodiment of the present invention.

In this embodiment, the message carrying the daylight saving time rule parameter and generated by the server may be a SOAP message; and referring to FIG. 3, the SOAP message includes a daylight saving time use field (DaylightSavingsUsed), a daylight saving time start field (DaylightSavingStart), and a daylight saving time end field (DaylightSavingEnd). The daylight saving time use field carries a daylight saving time enable flag, where the daylight saving time enable flag is used to display that daylight saving time is enabled or display that daylight saving time is disabled. In this embodiment, the daylight saving time enable flag displays that daylight saving time is enabled, the daylight saving time start field carries the daylight saving time start rule parameter, and the daylight saving time end field carries the daylight saving time end rule parameter.

Furthermore, referring to FIG. 3, in this embodiment, an offset field may be added into the SOAP message, where the offset field is used to carry an offset.

In this embodiment, the server generates a SOAP message before the daylight saving time system is implemented every year, where the SOAP message includes a daylight saving time use field, a daylight saving time start field, a daylight saving time end field, and an offset field, and the daylight saving time use field, daylight saving time start field, daylight saving time end field, and offset field included in the SOAP message respectively carry a daylight saving time enable flag, a daylight saving time start rule parameter, a daylight saving time end rule parameter, and an offset.

Figure 4:
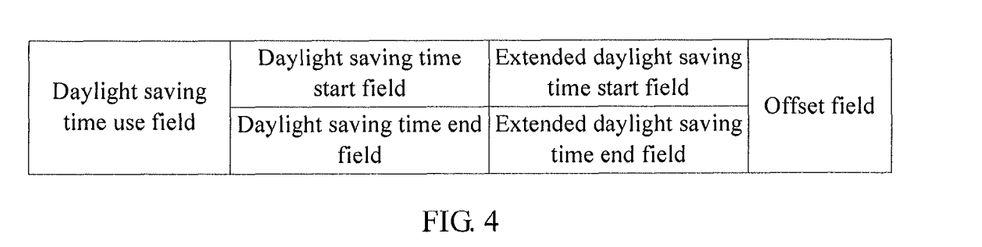
FIG. 4 is a schematic structural diagram of a second SOAP message according to another embodiment of the present invention.

Furthermore, referring to FIG. 4, in this embodiment, two fields may be further added into the SOAP message and are respectively an extended daylight saving time start field and an extended daylight saving time end field, where the extended daylight saving time start field carries a daylight saving time start rule parameter, and the extended daylight saving time end field carries a daylight saving time end rule parameter.

Step 202: The server sends the generated message carrying the daylight saving time rule parameter to a CPE, where the daylight saving time rule parameter includes the daylight saving time start rule parameter and the daylight saving time end rule parameter.

Step 203: The CPE receives the message carrying the daylight saving time rule parameter, judges a daylight saving time enable flag carried in the message, determines that the daylight saving time enable flag displays that daylight saving time is enabled, and then executes step 204.

Step 204: The CPE obtains the current year, and obtains start time of daylight saving time according to the obtained current year and the daylight saving time start rule parameter.

Specifically, the CPE obtains the current year, and extracts month m1, week w1, day d1, hour H1, minute M1, and second S1 from the daylight saving time start rule parameter; judges whether day d1 of week w1 exists in month m1 of the obtained current year; and if day d1 of week w1 exists in month m1 of the obtained current year, determines that a date complying with the daylight saving time rule parameter exists, and combines the obtained current year, the extracted month m1, week w1, day d1, hour H1, minute M1, and second S1 into the start time of the daylight saving time; or if day d1 of week w1 does not exist in month m1 of the obtained current year, determines that no date complying with the daylight saving time rule parameter exists, obtains the last day of month m1 of the current year, and combines the obtained current year, the extracted month m1, the obtained last day, the extracted hour H1, minute M1, and second S1 into the start time of the daylight saving time.

The CPE may obtain each week included in month m1 of the current year and days included in each week, and then judge whether day d1 of week w1 exists in the obtained month m1.

The operation of obtaining the current year by the CPE may specifically be: The CPE obtains the current year from a clock included in the CPE, or the CPE obtains the current year from a network.

Step 205: The CPE obtains end time of the daylight saving time according to the obtained current year and the daylight saving time end rule parameter.

Specifically, month m2, week w2, day d2, hour H2, minute M2, and second S2 are extracted from the daylight saving time end rule parameter; whether day d2 of week w2 exists in month m2 of the obtained current year is judged; and if day d1 of week w1 exists in month m1 of the obtained current year, it is determined that a date complying with the daylight saving time rule parameter exists, and the obtained current year, the extracted month m2, week w2, day d2, hour H2, minute M2, and second S2 are combined into the end time of the daylight saving time; or if day d1 of week w1 does not exist in month m1 of the obtained current year, it is determined that no date complying with the daylight saving time rule parameter exists, the last day of month m2 of the current year is obtained, and the obtained current year, the extracted month m2, the obtained last day, the extracted hour H2, minute M2, and second S2 are combined into the end time of the daylight saving time.

The CPE may obtain each week included in month m2 of the current year and days included in each week, and then determine whether day d2 of week w2 exists in the obtained month m2.

Step 206: The CPE obtains an offset, and according to the offset, sets, at the start time of the daylight saving time, the CPE itself to start using the daylight saving time, and according to the offset, sets, at the end time of the daylight saving time, the CPE itself to stop using the daylight saving time.

Specifically, the CPE obtains the offset, and when the obtained start time of the daylight saving time arrives, advances its current time by the obtained offset to start using the daylight saving time, and when the obtained end time of the daylight saving time arrives, sets back its current time by the obtained offset to stop using the daylight saving time.

The operation of obtaining the offset by the CPE may specifically be: If the received message further carries the offset, the CPE extracts the offset from the received message; and if the received message does not carry the offset, the CPE obtains a default offset stored by the CPE.

The daylight saving time start rule parameter and daylight saving time end rule parameter do not include the year. The CPE may obtain the start time of the daylight saving time according to the current year and daylight saving time start rule parameter, and obtain the end time of the daylight saving time according to the current year and daylight saving time end rule parameter. In this way, the administrator needs to configure the daylight saving time start rule parameter and daylight saving time end rule parameter only once in the server; then the server stores the configured daylight saving time start rule parameter and daylight saving time end rule parameter, and sends the daylight saving time start rule parameter and daylight saving time end rule parameter to the CPE through a message before the daylight saving time system is implemented every year. Therefore, the administrator does not need to configure the start time of the daylight saving time and the end time of the daylight saving time every year, and the cost of configuring the daylight saving time is reduced.

The CPE may send a prompt at the start time of the daylight saving time, so as to notify a user of starting using the daylight saving time, and/or send a prompt at the end time of the daylight saving time, so as to notify the user of stopping using the daylight saving time; and the CPE may send the prompt in a voice manner or send the prompt by displaying a message.

In the embodiment of the present invention, the CPE obtains the current year, and obtains the start time of the daylight saving time according to the current year and daylight saving time start rule parameter, obtains the end time of the daylight saving time according to the current year and daylight saving time end rule parameter, sets the CPE itself to start using the daylight saving time at the start time of the daylight saving time, and sets the CPE itself to stop using the daylight saving time at the end time of the daylight saving time. In this way, the daylight saving time start rule parameter and daylight saving time end rule parameter do not include the year, and the administrator needs to configure the daylight saving time start rule parameter and daylight saving time end rule parameter in the server only once without configuring the start time of the daylight saving time and the end time of the daylight saving time before the daylight saving time system is implemented every year. Therefore, daylight saving time can be configured in a single attempt and used permanently, and the cost of configuring the daylight saving time is reduced.

Figure 5:
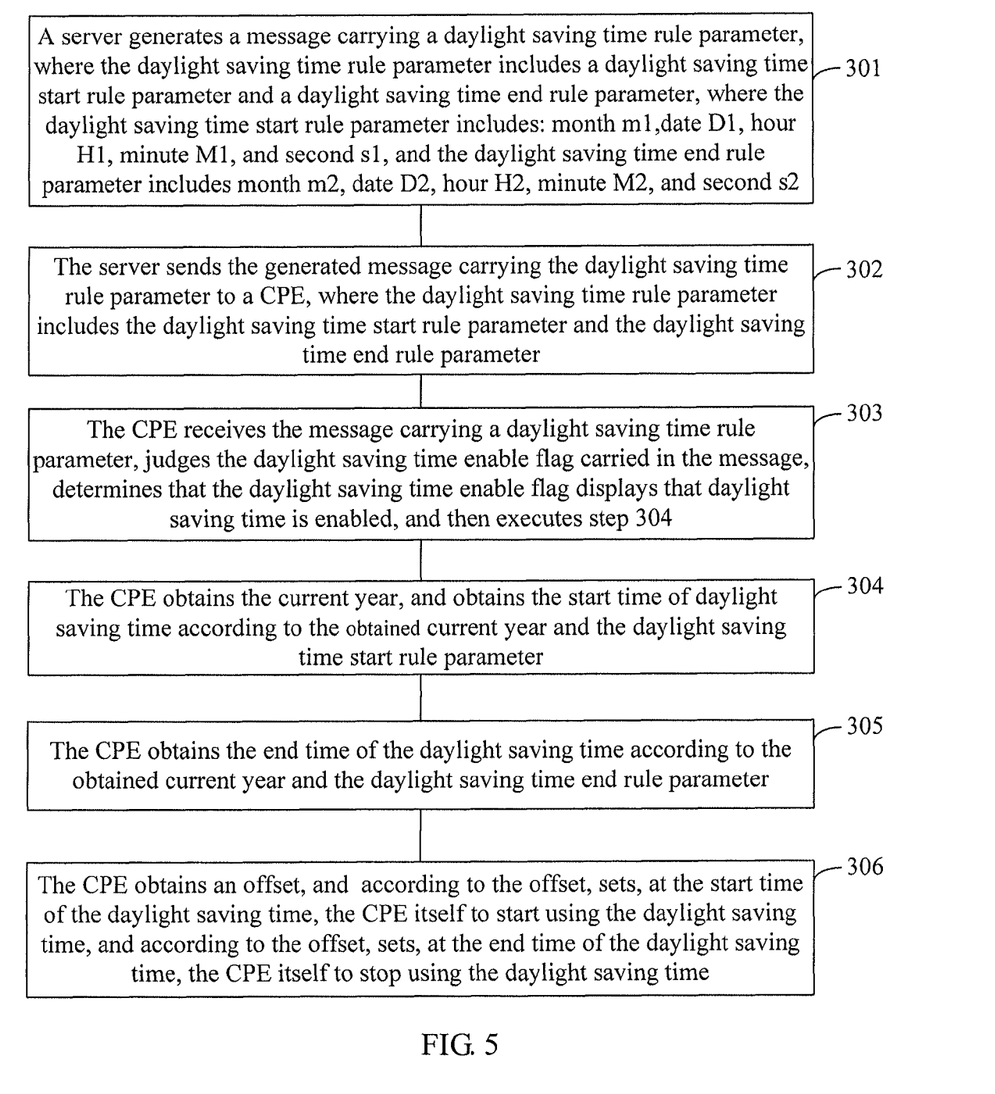
FIG. 5 is a flowchart of a method for configuring daylight saving time according to another embodiment of the present invention.

Referring to FIG. 5, an embodiment of the present invention provides a method for configuring daylight saving time, including:

Step 301: A server generates a message carrying a daylight saving time rule parameter, where the daylight saving time rule parameter includes a daylight saving time start rule parameter and a daylight saving time end rule parameter, where the daylight saving time start rule parameter includes: month m1, date D1, hour H1, minute M1, and second S1, and the daylight saving time end rule parameter includes month m2, date D2, hour H2, minute M2, and second S2.

Here, m1 and m2 are months, where the value of m1 is an integer in a range from 1 to 12, and the value of m2 is an integer in a range from m1 to 12; date D1 is date D1 of month m1, and date D2 is date D2 of month m2, where the value of D1 is an integer in a range from 1 to 31, and the value of D2 is an integer in a range from 1 to 31; hour H1 is hour H1 of date D1, and hour H2 is hour H2 of date D2, where the value of H1 is an integer in a range from 0 to 23, and the value of H2 is an integer in a range from 0 to 23; minute M1 is minute M1 of hour H1, and minute M2 is minute M2 of hour H2, where the value of M1 is an integer in a range from 0 to 59, and the value of M2 is an integer in a range from 0 to 59; and second S1 is second S1 of minute M1, and second S2 is second S2 of minute M2, where the value of S1 is an integer in a range from 0 to 59, and the value of S2 is an integer in a range from 0 to 59.

For example, in this embodiment, the daylight saving time start rule parameter may include month 4, date 1, hour 12, minute 29, and second 15, and the daylight saving time end rule parameter may include month 10, date 1, hour 23, minute 5, and second 30, where the time represented by the daylight saving time start rule parameter is 12:29:15 on April 1, and the time represented by the daylight saving time end rule parameter is 23:05:30 on October 1.

In this embodiment, the message generated by the server may further carry an offset. In this way, the offset may be set according to requirements of the laws and regulations in the place where a CPE is located. The offset is the time difference between the daylight saving time and the normal time, the offset is greater than or equal to 0 minutes, and the offset is measured in minutes.

An administrator may input the daylight saving time start rule parameter, daylight saving time end rule parameter, and offset into the server beforehand, and then the server stores the daylight saving time start rule parameter, daylight saving time end rule parameter, and offset. Correspondingly, the server generates a message carrying the daylight saving time rule parameter before the daylight saving time system is implemented every year, where the message carries a daylight saving time enable flag, the daylight saving time start rule parameter, the daylight saving time end rule parameter, and the offset.

In this embodiment, the message carrying the daylight saving time rule parameter and generated by the server may be a SOAP message. For the structure of the SOAP message, reference may be made to the content in step 201 of the foregoing embodiment, and details are omitted herein.

Step 302: The server sends the generated message carrying the daylight saving time rule parameter to a CPE, where the daylight saving time rule parameter includes the daylight saving time start rule parameter and the daylight saving time end rule parameter.

Step 303: The CPE receives the message carrying the daylight saving time rule parameter, judges a daylight saving time enable flag carried in the message, determines that the daylight saving time enable flag displays that daylight saving time is enabled, and then executes step 304.

Step 304: The CPE obtains the current year, and obtains start time of daylight saving time according to the obtained current year and the daylight saving time start rule parameter.

Specifically, the CPE obtains the current year, and extracts month m1, date D1, hour H1, minute M1, and second S1 from the daylight saving time start rule parameter; judges whether date D1 exists in month m1 of the obtained current year; and if day d1 of week w1 exists in month m1 of the obtained current year, determines that a date complying with the daylight saving time rule parameter exists, and combines the obtained current year, the extracted month m1, date D1, hour H1, minute M1, and second S1 into the start time of the daylight saving time; or if day d1 of week w1 does not exist in month m1 of the obtained current year, determines that no date complying with the daylight saving time rule parameter exists, obtains the last day of month m1 of the current year, and combines the obtained current year, the extracted month m1, the obtained last day, the extracted hour H1, minute M1, and second S1 into the start time of the daylight saving time.

The operation of obtaining the current year by the CPE may specifically be: The CPE obtains the current year from a clock included in the CPE, or the CPE obtains the current year from a network.

Step 305: The CPE obtains end time of the daylight saving time according to the obtained current year and the daylight saving time end rule parameter.

Specifically, month m2, date D2, hour H2, minute M2, and second S2 are extracted from the daylight saving time end rule parameter; whether date D2 exists in month m2 of the obtained current year is judged; and if day d1 of week w1 exists in month m1 of the obtained current year, it is determined that a date complying with the daylight saving time rule parameter exists, and the obtained current year, the extracted month m2, date D2, hour H2, minute M2, and second S2 are combined into the end time of the daylight saving time; or if day d1 of week w1 does not exist in month m1 of the obtained current year, it is determined that no date complying with the daylight saving time rule parameter exists, the last day of month m2 of the current year is obtained, and the obtained current year, the extracted month m2, the obtained last day, the extracted hour H2, minute M2, and second S2 are combined into the end time of the daylight saving time.

Step 306: The CPE obtains an offset, and according to the obtained offset, sets, at the start time of the daylight saving time, the CPE itself to start using the daylight saving time, and according to the obtained offset, sets, at the end time of the daylight saving time, the CPE itself to stop using the daylight saving time.

Specifically, the CPE obtains the offset, and when the obtained start time of the daylight saving time arrives, advances its current time by the obtained offset to start using the daylight saving time, and when the obtained end time of the daylight saving time arrives, sets back its current time by the obtained offset to stop using the daylight saving time.

The operation of obtaining the offset by the CPE may specifically be: If the received message further carries the offset, the CPE extracts the offset from the SOAP message;

and if the received message does not carry the offset, the CPE obtains a default offset stored by the CPE.

The daylight saving time start rule parameter and daylight saving time end rule parameter do not include the year. The CPE may obtain the start time of the daylight saving time according to the current year and daylight saving time start rule parameter, and obtain the end time of the daylight saving time according to the current year and daylight saving time end rule parameter. In this way, the administrator needs to configure the daylight saving time start rule parameter and daylight saving time end rule parameter only once in the server; then the server stores the configured daylight saving time start rule parameter and daylight saving time end rule parameter, and sends the daylight saving time start rule parameter and daylight saving time end rule parameter to the CPE through a message before the daylight saving time system is implemented every year. Therefore, the administrator does not need to configure the start time of the daylight saving time and the end time of the daylight saving time every year, and the cost of configuring the daylight saving time is reduced; in addition, the CPE may extract the offset from the received message, and therefore, the administrator may set the offset according to requirements of the laws and regulations in the place where the CPE is located.

The CPE may send a prompt at the start time of the daylight saving time, so as to notify a user of starting using the daylight saving time, and/or send a prompt at the end time of the daylight saving time, so as to notify the user of stopping using the daylight saving time; and the CPE may send the prompt in a voice manner or send the prompt by displaying a message.

In the embodiment of the present invention, the CPE obtains the current year, and obtains the start time of the daylight saving time according to the current year and daylight saving time start rule parameter, obtains the end time of the daylight saving time according to the current year and daylight saving time end rule parameter, sets the CPE itself to start using the daylight saving time at the start time of the daylight saving time, and sets the CPE itself to stop using the daylight saving time at the end time of the daylight saving time. In this way, the daylight saving time start rule parameter and daylight saving time end rule parameter do not include the year, and the administrator needs to configure the daylight saving time start rule parameter and daylight saving time end rule parameter in the server only once without configuring the start time of the daylight saving time and the end time of the daylight saving time before the daylight saving time system is implemented every year. Therefore, daylight saving time can be configured in a single attempt and used permanently, and the cost of configuring the daylight saving time is reduced.

Figure 6:
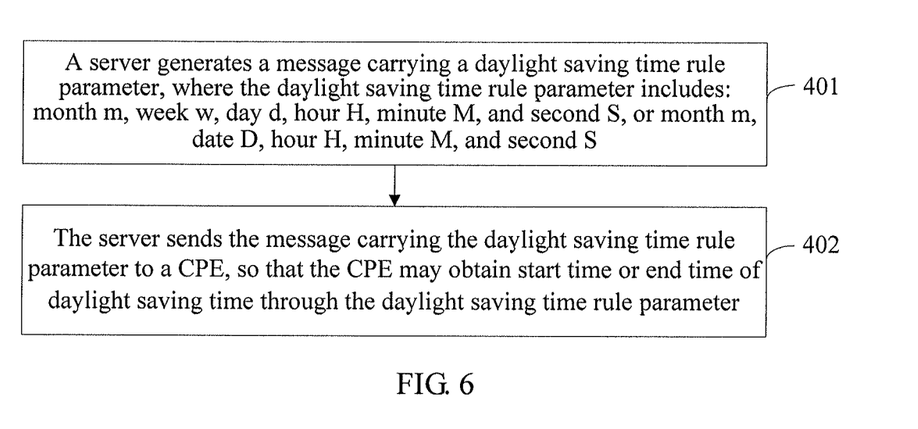
FIG. 6 is a flowchart of a method for configuring daylight saving time according to another embodiment of the present invention.

Referring to FIG. 6, an embodiment of the present invention provides a method for configuring daylight saving time, including:

Step 401: A server generates a message carrying a daylight saving time rule parameter, where the daylight saving time rule parameter includes: month m, week w, day d, hour H, minute M, and second S, or month m, date D, hour H, minute M, and second S.

Step 402: The server sends the message carrying the daylight saving time rule parameter to a CPE, so that the CPE may obtain start time or end time of daylight saving time through the daylight saving time rule parameter.

In the embodiment of the present invention, a server generates a message carrying a daylight saving time rule parameter, where the daylight saving time rule parameter includes: month m, week w, day d, hour H, minute M, and second S, or month m, date D, hour H, minute M, and second S, and sends the message carrying the daylight saving time rule parameter to a CPE, so that the CPE may obtain start time or end time of daylight saving time through the daylight saving time rule parameter. In this way, the daylight saving time rule parameter does not include the year, and an administrator needs to configure the daylight saving time rule parameter only once without configuring the start time of the daylight saving time and the end time of the daylight saving time before the daylight saving time system is implemented every year. Therefore, daylight saving time can be configured in a single attempt and used permanently.

Figure 7:
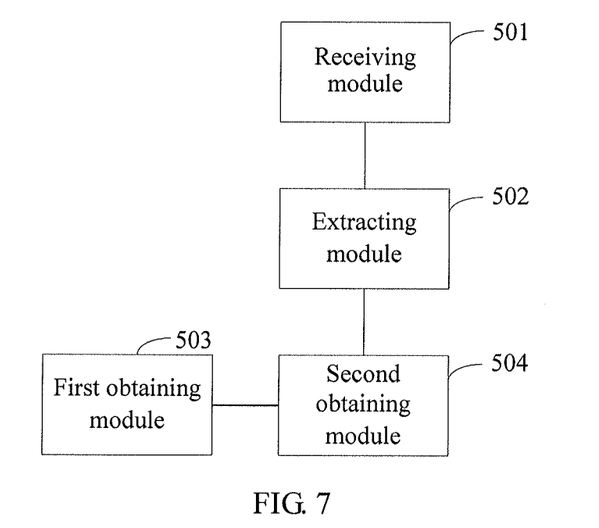
FIG. 7 is a schematic structural diagram of a CPE according to another embodiment of the present invention.

Referring to FIG. 7, an embodiment of the present invention provides a CPE, including:

a receiving module 501, configured to receive a message carrying a daylight saving time rule parameter;

an extracting module 502, configured to: if a daylight saving time enable flag displays that daylight saving time is enabled, extract the daylight saving time rule parameter from the message;

a first obtaining module 503, configured to obtain the current year of the CPE; and a second obtaining module 504, configured to obtain start time or end time of daylight saving time according to the current year and the daylight saving time rule parameter.

The daylight saving time rule parameter includes: month m, week w, day d, hour H, minute M, and second S; or
  month m, date D, hour H, minute M, and second S.
  Furthermore, the CPE further includes:

a combining module, configured to: if no date complying with the daylight saving time rule parameter exists, obtain the last day of m of the current year, and combine the current year, the extracted month m, the obtained last day, the extracted hour H, minute M, and second S into the start time or end time of the daylight saving time.

The daylight saving time rule parameter further includes an offset.

Furthermore, the CPE further includes:

a prompt module, configured to send a prompt when the start time or end time of the daylight saving time of a system arrives.

In the embodiment of the present invention, a CPE receives a message carrying a daylight saving time rule parameter; if a daylight saving time enable flag displays that daylight saving time is enabled, extracts the daylight saving time rule parameter from the message; obtains the current year; and obtains start time or end time of daylight saving time according to the obtained current year and the daylight saving time rule parameter. In this way, the daylight saving time rule parameter does not include the year, and an administrator needs to configure the daylight saving time rule parameter only once without configuring the start time of the daylight saving time and the end time of the daylight saving time before the daylight saving time system is implemented every year. Therefore, daylight saving time can be configured in a single attempt and used permanently.

Figure 8:
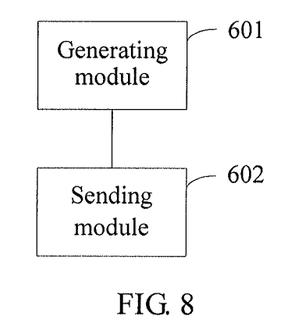
FIG. 8 is a schematic structural diagram of a server according to another embodiment of the present invention.

Referring to FIG. 8, an embodiment of the present invention provides a server, including:

a generating module 601, configured to generate a message carrying a daylight saving time rule parameter, where the daylight saving time rule parameter includes: month m, week w, day d, hour H, minute M, and second S, or month m, date D, hour H, minute M, and second S; and a sending module 602, configured to send the message carrying the daylight saving time rule parameter to a CPE, so that the CPE may obtain start time or end time of daylight saving time through the rule parameter.

In the embodiment of the present invention, a message carrying a daylight saving time rule parameter is generated, where the daylight saving time rule parameter includes: month m, week w, day d, hour H, minute M, and second S, or month m, date D, hour H, minute M, and second S, and the message carrying the daylight saving time rule parameter is sent to a CPE, so that the CPE may obtain start time or end time of daylight saving time through the rule parameter. In this way, the daylight saving time rule parameter does not include the year, and an administrator needs to configure the daylight saving time rule parameter only once without configuring the start time of the daylight saving time and the end time of the daylight saving time before the daylight saving time system is implemented every year. Therefore, daylight saving time can be configured in a single attempt and used permanently.

Figure 9:
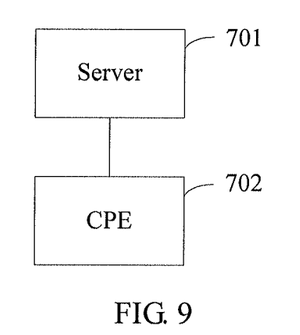
FIG. 9 is a schematic structural diagram of a system for configuring daylight saving time according to another embodiment of the present invention.

Referring to FIG. 9, an embodiment of the present invention provides a system for configuring daylight saving time, including a server 701 and a CPE 702.

The server 701 sends a message carrying a daylight saving time rule parameter, so that the CPE 702 may obtain start time or end time of daylight saving time through the rule parameter.

The CPE 702 receives and parses the message, so as to obtain the start time or end time of the daylight saving time.

The daylight saving time rule parameter includes: month m, week w, day d, hour H, minute M, and second S; or month m, date D, hour H, minute M, and second S.

In the embodiment of the present invention, a server generates a message carrying a daylight saving time rule parameter, where the daylight saving time rule parameter includes: month m, week w, day d, hour H, minute M, and second S, or month m, date D, hour H, minute M, and second S; a CPE may obtain start time or end time of daylight saving time through the rule parameter. In this way, the daylight saving time rule parameter does not include the year, and an administrator needs to configure the daylight saving time rule parameter only once without configuring the start time of the daylight saving time and the end time of the daylight saving time before the daylight saving time system is implemented every year. Therefore, daylight saving time can be configured in a single attempt and used permanently.

Persons of ordinary skill in the art may understand that all or a part of the steps of the foregoing embodiments may be implemented through hardware, or may be implemented by a program instructing relevant hardware. The program may be stored in a computer readable storage medium. The storage medium may be a read-only memory, a magnetic disk, or an optical disk, and so on.

The foregoing descriptions are merely exemplary embodiments of the present invention, but are not intended to limit the present invention. Any modification, equivalent replacement, or improvement made within the spirit and principle of the present invention should fall within the protection scope of the present invention.

I claim:

1. A method for configuring when to start using daylight saving time and when to stop using day light saving time in customer premises equipment (CPE), the method comprising:
   in the customer premises equipment (CPE) comprising hardware that executes program instructions and a memory having instructions stored therein that instruct the hardware to perform the method:
      receiving a message, by the CPE, the message carrying a daylight saving time rule parameter and a daylight saving time enable flag, wherein the daylight saving time rule parameter does not include a current year and is applied to years obtained by the CPE;
      determining by the CPE, whether the daylight saving time enable flag indicates that daylight saving time is enabled;
      in instances when the daylight saving time flag indicates that daylight saving time is enabled:
         extracting, by the CPE, the daylight saving time rule parameter from the message;
         obtaining, by the CPE, the current year of the CPE;
         determining, by the CPE, a start time or end time of daylight saving time according to the current year obtained from the CPE and the daylight saving time rule parameter received in the message; and
         setting the CPE, by the CPE, to start using daylight saving time at the start time of daylight saving time and to stop using daylight saving time at the end of daylight saving time.

2. The method according to claim 1, wherein the daylight saving time rule parameter comprises: month m, week w, day d, hour H, minute M, and second S; or month m, date D, hour H, minute M, and second S.

3. The method according to claim 2, further comprising:
   if no date complying with the daylight saving time rule parameter exists, obtaining a last day of month m of the current year, and combining the current year, the month m, the obtained last day, the extracted hour H, minute M, and second S into the start time or end time of the daylight saving time.

4. The method according to claim 3, wherein the daylight saving time rule parameter further comprises an offset.

5. The method according to claim 3, further comprising:
   sending a prompt, when the start time or end time of the daylight saving time of a system arrives.

6. The method according to claim 2, wherein the daylight saving time rule parameter further comprises an offset.

7. The method according to claim 1, wherein the daylight saving time rule parameter further comprises an offset.

8. The method according to claim 7, further comprising:
   sending a prompt, when the start time or end time of the daylight saving time of a system arrives.

9. The method according to claim 1, further comprising:
   sending a prompt, when the start time or end time of the daylight saving time of a system arrives.

10. A customer premises equipment CPE, comprising hardware that executes program instructions, and a memory having instructions stored therein that instruct the hardware to:
   receive a message carrying a daylight saving time rule parameter wherein the daylight saving time rule parameter does not include a current year and is applied to years obtained by the CPE;
   if a daylight saving time enable flag displays that daylight saving time is enabled, extract the daylight saving time rule parameter from the message;
   obtain the current year of the CPE; and
   obtain start time or end time of daylight saving time according to the current year obtained from the CPE and the daylight saving time rule parameter received in the message.

11. The CPE according to claim 10, wherein the daylight saving time rule parameter comprises: month m, week w, day d, hour H, minute M, and second S; or month m, date D, hour H, minute M, and second S.

12. The CPE according to claim 11, further comprising wherein:
   if no date complying with the daylight saving time rule parameter exists, to obtain a last day of month m of the current year, and combine the current year, the month m, the obtained last day, the extracted hour H, minute M, and second S into the start time or end time of the daylight saving time.

13. The CPE according to claim 12, wherein the daylight saving time rule parameter further comprises an offset.

14. The CPE according to claim 12, further to:
send a prompt when the start time or end time of the daylight saving time of a system arrives.

15. The CPE according to claim 11, wherein the daylight saving time rule parameter further comprises an offset.

16. The CPE according to claim 10, wherein the daylight saving time rule parameter further comprises an offset.

17. The CPE according to claim 16, further to:
send a prompt when the start time or end time of the daylight saving time of a system arrives.

18. The CPE according to claim 10, further to:
send a prompt when the start time or end time of the daylight saving time of a system arrives.

19. A method for configuring to when to start using daylight saving time and when to stop using daylight saving time in a customer premises equipment (CPE), comprising:
in a server comprising hardware that executes program instructions, and memory having instructions stored therein that instruct the hardware to perform the method:
generating, by the server, a message carrying a daylight saving time rule parameter, wherein the daylight saving time rule parameter comprises: month m, week w, day d, hour H, minute M, and second S, or month m, date D, hour H, minute M, and second S without current year information, and a daylight saving time enable flag; and
sending, by the server, the message carrying the daylight saving time rule parameter and the daylight saving time enable flag to the CPE, so that the CPE obtains start time or end time of daylight saving time through the rule parameter.

* * * * *